United States Patent [19]

Cole

[11] Patent Number: 4,489,785

[45] Date of Patent: Dec. 25, 1984

[54] METHOD OF COMPLETING A WELL BORE PENETRATING A SUBTERRANEAN FORMATION

[75] Inventor: Robert C. Cole, Duncan, Okla.

[73] Assignee: Halliburton Company, Duncan, Okla.

[21] Appl. No.: 515,326

[22] Filed: Jul. 19, 1983

[51] Int. Cl.³ .............................................. E21B 33/14
[52] U.S. Cl. ...................................... 166/295; 523/130
[58] Field of Search ........................... 166/295, 305 D; 523/130

[56] References Cited

U.S. PATENT DOCUMENTS

| Re. 29,586 | 3/1978 | Merlino et al. | 525/523 |
|---|---|---|---|
| 3,250,330 | 5/1966 | Smith, Jr. | |
| 3,394,105 | 7/1968 | Christie | |
| 3,728,277 | 4/1973 | Foley | |
| 3,873,493 | 3/1975 | Labana et al. | 524/904 |
| 3,960,801 | 6/1976 | Cole et al. | 260/33.6 EP |
| 4,072,194 | 2/1978 | Cole et al. | 166/295 |
| 4,081,491 | 3/1978 | Baver | 525/510 |
| 4,216,829 | 8/1980 | Murphey | 166/276 |
| 4,268,656 | 5/1981 | Ray-Chaudhuri | 528/98 |
| 4,331,582 | 5/1982 | Babayan | 523/453 |
| 4,396,657 | 8/1983 | Ibrahim | 428/294 |
| 4,430,484 | 2/1984 | Quinn | 525/425 |

OTHER PUBLICATIONS

Chemical Abstracts: CA 66:38395h; CA 68:87825y; CA 85:161095e; CA 87:69915r; CA 88:191868p; CA 91:145082s.
Journal of Applied Polymer Science, vol. 23, pp. 159–168 (1965).

*Primary Examiner*—Stephen J. Novosad
*Assistant Examiner*—Mark J. DelSignore
*Attorney, Agent, or Firm*—Robert A. Kent; Thomas R. Weaver

[57] ABSTRACT

A method whereby a conduit can be sealed within a subterranean formation utilizing a selected epoxy resin composition which upon setting forms a substantially crack-free, impermeable solid. The epoxy resin composition bonded to the conduit is capable of cyclic temperature variation without stress cracking or a decrease in bond strength.

15 Claims, No Drawings

METHOD OF COMPLETING A WELL BORE PENETRATING A SUBTERRANEAN FORMATION

BACKGROUND OF THE INVENTION

1. Field of the Invention

The present invention provides a method of sealing a conduit within a well bore penetrating a subterranean formation whereby the integrity of particular regions of a subterranean formation separated by natural barriers is maintained.

2. Brief Description of the Prior Art

Liquid waste from industrial plants is being disposed of by injecting the liquid waste into subterranean formations. Subterranean formations suitable for accepting liquid waste accept large volumes of waste and are generally separated by natural barriers from formations containing potable water or useful fluids such as oil and gas.

Some of the liquid waste which is disposed of in subterranean formations is corrosive to the steel and the hydraulic cement which has historically been used in the completion of well bores penetrating subterranean formations. In one method of completing well bores penetrating subterranean formations, a steel conduit is placed in the well bore and a hydraulic cement sealing composition is placed between the conduit and the well bore to isolate the zones traversed by the well bore. An example of corrosive liquid waste being disposed of in this manner is acidic liquid waste from steel pickling baths. Certain acids can corrode steel to the point of failure and can dissolve hydraulic cement. If this happens, the liquid waste could be injected unknowingly into a zone containing potable water or other useful fluids.

Well bores through which liquid waste is injected into subterranean formations should be completed with materials which will not be corroded by flowing the liquid waste through the well bore. Epoxy resin has been found to be resistant to degradation by liquid waste containing many inorganic compounds.

To use epoxy resin for the completion of liquid waste disposal wells, the epoxy must be mixed with a curing or hardening agent which will harden the epoxy resin after a latent period such that the epoxy resin composition can be placed into specific areas in the disposal well. The epoxy resin composition should also include a liquid diluent for the epoxy resin such that the epoxy resin composition will have a viscosity low enough for placing the epoxy resin composition in the disposal well by pumping. The diluents also must be able to absorb sufficient heat to prevent intense heat build-up within the epoxy resin composition while the epoxy is being mixed with the curing agent and diluent and while the composition is being placed in the well bore. Additionally, the cured epoxy resin composition should be immune to stress cracking.

The rate of polymerization of the epoxy resin composition, preferably, should be relatively insensitive to the presence of contaminants such as quantities of water.

To maintain isolation of liquid wastes being injected into certain subterranean formations, epoxy resin compositions which remain substantially free of stress related cracks, particularly when the cured resin is subjected to fluctuations in temperatures, would be desirable. The epoxy resin also can be used to seal cracks or holes in a conduit penetrating a subterranean formation.

SUMMARY OF THE INVENTION

The present invention provides a method whereby a conduit can be sealed within a subterranean formation utilizing an epoxy resin composition which upon setting is substantially free of stress related cracking.

The resin is prepared by admixing an epoxy resin and a liquid diluent with an optional coupling agent, a solid diluent and a curing or hardening agent. The epoxy resin composition has an extended pumping time as a result of latent curing. The epoxy resin composition is introduced into a subterranean formation to seal a conduit within a well bore penetrating the formation. Upon curing, the epoxy resin composition forms a hard, impermeable solid which is substantially free of stress cracking.

DESCRIPTION OF THE PREFERRED EMBODIMENT

The epoxy resin composition of the present invention comprises an epoxy resin, a curing or hardening agent, a liquid diluent, an optional coupling agent and a solid diluent.

The epoxy resin comprises a polyepoxide obtained by reacting an epihalohydrin, such as epichlorohydrin, epibromohydrin and the like with either a polyhydric phenol or a polyhydric alcohol. In addition, the phenolic rings may have other substituents besides the hydroxyl group such as, for example, lower alkyl groups, halogen atoms and the like.

An illustrative, but by no means exhaustive listing of dihydric phenols falling within this general formula includes:

4,4'-dihydroxydiphenylmethylmethane, (Bisphenol A),
2,4'-dihydroxydiphenylethylmethane
3,3'-dihydroxydiphenyldiethylmethane
3,4'-dihydroxydiphenylmethylpropylmethane,
2,3'-dihydroxydiphenylethylphenylmethane,
4,4'-dihydroxydiphenylpropylphenylmethane,
4,4'-dihydroxydiphenylbutylphenylmethane,
2,2'-dihydroxydiphenylditolylmethane,
4,4'-dihydroxydiphenyltolylmethylmethane, and the like.

Other polydydric phenols which may also be co-reacted with an epihalohydrin to provide these resinous epoxy polyethers are such compounds as resorcinol, hydroquinone, substituted hydroquinones, such as, p-tert.-butylhydroquinone, and the like, and polyhydric phenols having two hydroxyl aryl groups separated by an aliphatic chain of at least six carbon atoms in length, said chain being attached by carbon-to-carbon bonding to nuclear carbon atoms of the hydroxylaryl groups.

Among the polyhydric alcohols which can be co-reacted with an epihalohydrin to provide these resinous epoxy polyethers are such compounds as ethylene glycols, pentane diols, bis-(4-hydroxycyclohexyl)-dimethylmethane, 1,4-dimethylolbenzene, glycerol, 1,2,6-hexanetriol, trimethylol propane, manitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2,2',3,3'-tetrahydroxydipropyl sulfide and the like, mercapto alcohols such as -monothio-glycerol, -dithio-glycerol, and the like, polyhydric alcohol partial esters such as monostearin, pentaerythritol monoacetate and the like polyhydric alcohol partial esters such as monstearin, pentaerythritol monoacetate and the like, and halogenated polyhydric alcohols such as the monochlorohydrins of glycerol, sorbitol, pentaerythritol and the like.

The epoxy resin comprises from about 25 to about 35 percent by weight of the epoxy resin composition. Preferably, the epoxy resin comprises from about 25 to about 30 percent by weight.

The curing or hardening agent comprises 2-ethyl-4-methylimidazole. The curing agent causes the epoxy resin to polymerize after a latent period at a temperature below 120° F. to a hard, impermeable, substantially crack-free, high-strength solid. The curing agent is substantially activated at temperatures in excess of about 140° F.

The curing agent comprises from about 0.25 to about 2.5 percent by weight of the epoxy resin composition. Preferably, the curing agent comprises from about 0.75 to about 1 percent by weight of the epoxy resin composition.

The liquid diluent comprises a diluent or mixture of diluents represented by the following general formula:

$$C_6(R_1)_6$$

wherein $R_1$ is hydrogen; a straight or branched chain alkyl radical; a cycloparaffin radical, or a mixture thereof; wherein the alkyl and cycloparaffin radicals have within the range of about 1 to 10 carbon atoms; and further wherein at least one $R_1$ group is said alkyl or cycloparaffin radical. Preferred liquid diluents are diluent or mixture of diluents represented by the following:

$$C_6H_2(R_3)_4$$

wherein $R_3$ is hydrogen; a straight or branched chain alkyl radical having within the range of about 1 to 3 carbon atoms, or mixtures thereof; and further wherein at least two $R_3$ groups are said alkyl radicals.

Examples of such suitable liquid diluents include but are not limited to toluene, ethylbenzene, n-propylbenzene, isopropylbenzene, n-butylbenzene, isobutylbenzene, cyclohexylbenzene, n-hexylbenzene, o-xylene, m-xylene, p-xylene, o-diethylbenzene, m-diethylbenzene, p-diethylbenzene, 2-chloro-p-xylene, o-diisopropylbenzene, m-diisopropylbenzene, p-diisopropylbenzene, 2-nitro-p-xylene, p-cymene, m-cymene, o-cymene, durene, isodurene, 1,2,3-trimethylbenzene, 1,2,4-trimethylbenzene, 1,3,5-trimethylbenzene, 1,3,5-triethylbenzene, 1,2,4-triethylbenzene, o-dibutylbenzene, m-dibutylbenzene, p-dibutylbenzene, penta-methylbenzene, 1-pentyl-3-ethylbenzene, p-pentyltoluene, 1-hexyl-3-isobutylbenzene, m-hexyltoluene, 1-heptyl-3-isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylbenzene, p-isodecyltoluene, and 1-decyl-3-isotridecylbenzene.

The liquid diluent comprises from about 5 to about 25 percent by weight of the epoxy resin composition. Preferably, the liquid diluent comprises from about 8 to about 12 percent by weight. Volumetrically, the constituents of the uncured epoxy resin composition are admixed in the following relative percentages: from about 35 percent to about 55 percent epoxy resin; from about 10 percent to about 30 percent liquid diluent; and from about 20 percent to about 40 percent solid diluent. The curing agent is present in the epoxy resin composition in an amount of about 1 to 10 parts per hundred parts of epoxy resin (pphr). A preferred epoxy resin composition comprises, by volume, about 40 percent epoxy resin, about 20 percent liquid diluent and about 35 percent to about 40 percent solid diluent. The curing agent is present in an amount of about 3 pphr.

The adhesion-promoting coupling agent comprises an organofunctional silane compound such as, for example, gamma-aminopropyltriethyoxysilane, N-beta-(aminoethyl)-gamma-aminopropyltrimethoxysilane and the like. The organofunctional silane compound facilitates bonding between the epoxy resin and silica or metal oxide surfaces and to the inorganic nonreactive solid diluent included in the composite epoxy resin composition by hydrolizing of the alkoxy groups to form silanols that react with or otherwise condense in the presence of silica, clay or metal oxide surfaces. At the other end of the silane molecule, the functional organic groups (such as vinyl, epoxy and amino) react with the organic matrix resin.

The organofunctional silane compound can comprise from about 0.01 to about 1.0 percent by weight of the epoxy resin composition. Preferably, the organofunctional silane compound comprises from about 0.1 to about 0.5 percent by weight of the composition. Alternatively, the organofunctional silane compound can be present in the composition in an amount of from about 0.035 to about 3.5 pphr. In the preferred composition set forth above, the organofunctional silane compound preferably is present in an amount of about 0.6 pphr.

The epoxy resin composition hereinabove described is useful for sealing or cementing the annular space between a conduit traversing a well bore penetrating a subterranean formation and the well bore. The epoxy resin composition cures to a hard, impermeable, substantially crack-free solid which seals the annular space surrounding the conduit within the well bore to isolate the zones penetrated by the well bore. Surprisingly, it has been discovered that the epoxy resin composition of the present invention remains substantially free of stress cracks for in excess of 90 days after curing. Further, the epoxy resin composition has been found to withstand cyclic temperature fluctuations when cured within the subterranean formation without cracking or other failure of the bond formed between the epoxy resin composition and the conduit or the epoxy resin composition and the constituents of the subterranean formation.

The epoxy resin composition is prepared by admixing the epoxy resin with the liquid diluent in the proportions hereinbefore set forth. A predetermined quantity of the coupling agent is admixed with the epoxy resin-liquid diluent mixture. A quantity of the solid diluent then is admixed with the epoxy resin-liquid diluent mixture. The curing agent then is admixed with the other constituents of the epoxy resin composition and the admixture is introduced into the well bore penetrating the subterranean formation.

Prior to introducing the epoxy resin composition into the well bore penetrating the subterranean formation, it often is desirable to introduce a quantity of a nonaqueous preflush into the subterranean formation. The preflush displaces any aqueous fluids or other materials which may contaminate the epoxy resin composition. The preflush can comprise diesel fuel, lease crude or the like.

In one embodiment, the epoxy resin composition is introduced into the conduit traversing the well bore penetrating the subterranean formation and terminating near the zone to be sealed. The epoxy resin composition is pumped down the conduit to the zone to be sealed and is caused to flow back up the annulus comprising the space between the walls of the well bore and the exterior of the conduit positioned therein by a suitable diverter device such as are well known to individuals skilled in the art.

The desired quantity of epoxy resin composition to seal the zone is pumped into the conduit and a nonaqueous displacement fluid is introduced following the epoxy resin composition to remove the composition from the interior of the conduit. The epoxy resin composition is heated by the subterranean formation and the curing reaction to a temperature above about 140° F. at which temperature the composition begins more active polymerization. Preferably, the temperature of the formation is in the range of from about 175° F. to about 225° F. The epoxy resin composition cures to a hard, impenetrable, substantially crack-free solid which, by virtue of mutual bonding to the conduit and the earthen formation traversed by the borehole, isolates one or more zones within the subterranean formation from the remainder of the formation.

Other compositions employing the same constituents at concentrations outside the ranges hereinabove identified have been found either to exhibit significant cracking when cured under and exposed to the conditions which exist in the sealing of a subterranean formation or to have a viscosity or texture such that the composition cannot be properly placed within a desired location in a subterranean formation and therefore are not useful to isolate various zones penetrated by the well bore.

The following examples are presented to illustrate the composition and method of the present invention and not by way of limitation.

EXAMPLE I

To illustrate the effect the composition has upon the tendency of the cured epoxy resin composition to crack from internal stresses during curing, the pumpability of the composition and the hydraulic bond strength of selected compositions, the following tests are performed.

Procedure 1

This test is used to simulate the condition of a conduit (well casing) surrounded by an epoxy resin composition that is cured in an elevated temperature subterranean formation. A 2"×2"×2" dismantable mold is coated with silicone grease, an uncoated ¾" diameter steel rod, 3" long, is vertically centered in the mold. The formulations set forth in the following table were poured into the mold with the rod in the center. The filled mold is immersed in a 200° F. water bath and cured for 48 hours. The mold then is removed from the cube and the specimen is examined for cracks orienting from the steel rod outward to the edges of the cube. Each test is run in duplicate.

Procedure 2

The texture of the epoxy resin composition was determined by visual observation to evaluate the ability to mix the epoxy resin composition at a remote job site and pump the mixture into a subterranean formation prior to curing. Mixtures capable of field mixing and pumping into a subterranean formation are labeled "OK", mixtures which were too viscous to permit pumping are labeled "NA" for not acceptable.

Procedure 3

The hydraulic bond to a steel conduit is determined by bonding a 2" nominal diameter iron pipe nipple in a one gallon quantity of epoxy resin composition. A one-gallon capacity, cylindrical can has a 1-½" diameter hole cut halfway between the top and bottom of the side wall. The iron pipe nipple is sand blasted and placed vertically in the center of the can. The nipple is filled with sand to prevent flotation. A single hole No. 000 rubber stopper is glued around its perimeter edges to the pipe nipple in line with the center of the hole in the side of the can. A ¼" pressure test nipple is forced through a No. 9 single hole rubber stopper and the stopper is forced into the hole in the side of the can. The ¼" pressure test nipple is forced over the exposed end of the No. 000 stopper on the side of the pipe nipple sufficiently to form a good seal. Selected formulations set forth in the Table then are poured into a can and the epoxy resin composition is cured for 48 hours.

Pressure testing is performed by tipping the can within the water bath such that only the pressure test nipple extends above the surface of the water. A ¼" copper line with a hand pump and pressure gauges then is connected to the pressure test nipple. Water tagged with soluble fluorescein dye is pumped through the pressure test line. When rapid loss of pressure occured in the pressure test line, the pressure is recorded and pumping is terminated. The pressure at which rapid pressure loss occurs is considered to be the failure pressure for the bond of the epoxy resin composition with the steel conduit.

The epoxy resin employed in the following tests comprised Epon 828 produced by Shell Chemical Company. The epoxy resin comprises an epichlorohydrin and bisphenol A condensate with a viscosity of about 100–160 poises.

The liquid diluent comprised a mixture of aromatic diluents represented by the general formula:

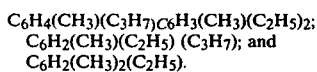

The curing agent comprises either 2-ethyl-4-methylimidazole (EMI-24) or a commercial polyamide (PA) having an amine value of about 330 to 360 and a viscosity at 25° C. of about 40,000 to about 60,000 centipoise. An accelerator (DMP-30) comprising 2, 4, 6-Tri(-dimethylaminomethyl) phenol is employed in some instances with the polyamide. Diethyl-phthalate (DEP) was admixed with both EMI-24 and PA as an elastomer constituent.

The silane compound comprised gamma-aminopropyltri-ethoxysilane.

The solid diluent comprised an inert ground silica solid having a particle size of approximately 200 mesh on the U.S. Sieve Series.

The results of the tests are set forth below:

TABLE

| Test No. | Epon 828 Wt. % | Liquid Diluent Wt. % | Curing Agent Composition | Curing Agent Wt. % | Silane Compound Wt. % | Solid Diluent Wt. % | Procedure 1 | Procedure 2 | Procedure 3 pressure, psi |
|---|---|---|---|---|---|---|---|---|---|
| 1 | 22.4 | 12.6 | PA(DMP-30) | 5.4(.3) | — | 59.2 | cracked | OK | 70 |
| 2 | 24 | 13.5 | PA | 5.8 | — | 56.7 | cracked | NA | — |
| 3 | 23.8 | 13.4 | PA(DMP-30) | 5.7(.3) | — | 56.7 | cracked | NA | — |
| 4 | 25.1 | 14.1 | PA | 6.0 | — | 54.5 | cracked | NA | — |
| 5 | 25 | 14.1 | PA(DMP-30) | 6.0(.4) | — | 54.5 | cracked | NA | — |
| 6 | 21.6 | 12.2 | PA(DMP-30) | 5.2(.3) | — | 60.8 | cracked | NA | — |
| 7 | 21.6 | 12.2 | PA | 5.2 | — | 61 | cracked | NA | — |
| 8 | 23 | 12.9 | EMI-24 | 1.0 | .3 | 62.7 | no cracks | OK | — |
| 9 | 23 | 12.9 | EMI-24 | 1.3 | — | 62.7 | no cracks | OK | — |
| 10 | 27.1 | 15.3 | EMI-24 | 1.6 | — | 56 | no cracks | OK | — |
| 11 | 28.2 | 10.4 | EMI-24 | .3 | .2 | 60.9 | no cracks | OK | — |
| 12 | 26.5 | 9.9 | EMI-24 | 1.4 | — | 62.2 | no cracks | OK | — |
| 13 | 28.4 | 6.2 | PA(DMP-30) | 6.9(.2) | — | 58.4 | no cracks | NA | — |
| 14 | 34.1 | — | PA(DMP-30) | 8.1(.2) | — | 57.6 | one not cracked one cracked | NA | — |
| 15 | 21.3 | 12 | PA(DMP-30) | 10.2(.3) | — | 56.2 | cracked | NA | — |
| 16 | 20.3 | 11.4 | PA(DMP-30) | 14.6(.3) | — | 53.5 | cracked | NA | — |
| 17 | 20.3 | 11.4 | PA | 14.6 | — | 53.6 | cracked | NA | — |
| 18 | 28 | 10.4 | EMI-24 | .9 | .2 | 60.5 | no cracks | OK | 1,475 |
| 19 | 26.5 | — | EMI-24(DEP) | 1.4(9.2) | — | 62.2 | no cracks | NA | 200 |
| 20 | 22.9 | 12.9 | EMI-24 | 1.3 | .3 | 62.5 | no cracks | OK | 600 |
| 21 | 25.4 | 8.6 | PA(DMP-30)(DEP) | 6.1(.1)(.8) | — | 58.8 | no cracks | NA | 300 |
| 22 | 25.5 | 6.3 | PA(DMP-30)(DEP) | 6.1(.1)(3.1) | — | 58.9 | no cracks | NA | 600 |

The data clearly illustrates the beneficial results which are derived from the use of the composition of the present invention in the sealing of well bores and conduits within subterranean formations to isolate various zones within the subterranean formation.

EXAMPLE II

To illustrate the effect that water contamination has upon the pumping time before setting of the epoxy resin composition of the present invention, the following tests are performed. An epoxy resin composition is prepared comprising about 28.3% Epon 828, 10% liquid diluent, 0.9% EMI-24, 0.2% silane compound and 60.6% solid diluent by weight is prepared. The composition is divided into three samples. Two the samples are contaminated with 1% and 5% by weight of water, respectively, and the pumping time until significant viscosity increase upon setting is determined. A viscosity level of approximately 7,000 centipoise is considered the end of pumpability.

The pumping time of the samples is as follows:

| Sample No. | Contaminant | Time, Minutes |
|---|---|---|
| 1 | no water | 242 minutes |
| 2 | 1% water by weight of epoxy resin composition | 196 minutes |
| 3 | 5% water by weight of epoxy resin composition | 178 minutes |

The contamination causes about a 21% and 26% reduction in pumping time, respectively. In contrast to the composition of the present invention, an epoxy resin employing a polyamide curing agent will experience in excess of a 60% reduction in pumping time when contaminated with about 1% to 5% by volume of water.

While that which presently is considered to be the preferred embodiment of the invention has been described herein, it is to be understood that changes and modifications can be made in the method and composition by an individual skilled in the art without departing from the spirit or scope of the invention as set forth in the appended claims.

What is claimed is:

1. A method of completing a well bore penetrating a subterranean formation having a temperature in excess of about 120° F. comprising the steps of:
    introducing an epoxy resin composition comprising, on a weight basis, from about 25% to about 35% of a polyepoxide obtained by reacting an epihalohydrin with at least one member selected from the group consisting of polyhydric phenol and polyhydric alcohol, from about 5% to about 25% of a liquid diluent comprising an aromatic hydrocarbon of the general formula $C_6(R_1)_6$ wherein $R_1$ is hydrogen, a straight or branched chain alkyl radical, a cycloparaffin radical or a mixture thereof wherein each alkyl and cycloparaffin radical has about 1 to 10 carbon atoms, from about 0.25% to about 2.5% of a curing agent comprising 2-ethyl-4-methylimidazole and a solid diluent into a subterranean formation to be sealed; and, maintaining the epoxy resin composition in said formation until the resin composition cures to a high-strength, substantially crack-free, impermeable solid.

2. The method of claim 1 wherein said epoxy resin comprises from about 25% to about 30% by weight of the epoxy resin composition.

3. The method of claim 1 wherein said liquid diluent comprises from about 8% to about 12% by weight of said epoxy resin composition.

4. The method of claim 1 wherein said curing agent comprises from about 0.75% to about 1% by weight of said epoxy resin composition.

5. A method for sealing a conduit in a well bore penetrating a subterranean formation comprising
    introducing an epoxy resin composition capable of curing into a substantially crack-free impermeable solid into said well bore surrounding said conduit, said epoxy resin composition comprising, on a weight basis, from about 25% to about 35% of a polyepoxide obtained by reacting an epihalohydrin with at least one member selected from the group consisting of polyhydric phenol and polyhydric alcohol, from about 5% to about 25% of a liquid diluent comprising an aromatic hydrocarbon of the general formula $C_6(R_1)_6$ wherein $R_1$ is hydrogen, a straight or branched chain alkyl radical, a cycloparaffin radical or a mixture thereof wherein each alkyl and cycloparaffin radical has about 1 to 10 carbon atoms, from about 0.25% to about 2.5% of a curing agent comprising 2-ethyl-4-methylimidazole and a solid diluent into a subterranean formation to be sealed; and, maintaining said epoxy resin composition in said formation until said resin composition hardens to a substantially crack-free solid.

6. The method of claim 5 wherein said epoxy resin comprises from about 25% to about 30% by weight of the epoxy resin composition.

7. The method of claim 5 wherein said liquid diluent comprises from about 8% to about 12% by weight of said epoxy resin composition.

8. The method of claim 5 wherein said curing agent comprises from about 0.75% to about 1% by weight of said epoxy resin composition.

9. The method of claim 5 wherein said epoxy resin composition is heated to a temperature level in the range of from about 140° F. to about 225° F. during said curing.

10. A method for producing a cementing media for sealing a conduit subjected to temperature fluctuations in a subterranean formation comprising:

admixing an epoxy resin, liquid diluent, solid diluent and a curing agent to form an epoxy resin composition, said epoxy resin comprising a polyepoxide obtained by reacting an epihalohydrin with at least one member selected from the group consisting of polyhydric phenol and polyhydric alcohol, said epoxy resin being present in an amount of from about 25 to about 35 percent by weight of said epoxy resin composition, said liquid diluent comprising an aromatic hydrocarbon of the general formula $C_6(R_1)6$ wherein $R_1$ is hydrogen, a straight or branched chain alkyl radical, a cycloparaffin radical or a mixture thereof wherein each alkyl and cycloparaffin radical has about 1 to 10 carbon atoms, said liquid diluent being present in an amount of about 5 to 25 percent by weight of said epoxy resin composition, said curing agent comprising 2-ethyl-4-methylimidazole and being present in an amount of from about 0.25 to about 2.5 percent by weight of said epoxy resin composition;

introducing said epoxy resin composition into said subterranean formation to seal said conduit within said subterranean formation;

heating said epoxy resin composition within said subterranean formation to a temperature in excess of about 120° F. to rapidly polymerize the epoxy resin of said epoxy resin composition to form an impermeable substantially crack-free seal about said conduit in said subterranean formation, said impermeable seal being capable of withstanding the stresses caused by temperature fluctuations of said conduit within said formation without cracking from said stresses.

11. The method of claim 10 wherein said epoxy resin comprises from about 25% to about 30% by weight of the epoxy resin composition.

12. The method of claim 10 wherein said liquid diluent comprises from about 8% to about 12% by weight of said epoxy resin composition.

13. The method of claim 10 wherein said curing agent comprises from about 0.75% to about 1% by weight of said epoxy resin composition.

14. The method of claim 10 wherein said epoxy resin composition is heated to a temperature in the range of from about 140° F. to about 225° F. during curing of said epoxy resin composition.

15. The method of claim 10 wherein said epoxy resin composition is heated to a temperature in the range of from about 175° F. to about 225° F. during curing of said epoxy resin composition.

* * * * *